US009882651B2

(12) United States Patent
Walker

(10) Patent No.: US 9,882,651 B2
(45) Date of Patent: Jan. 30, 2018

(54) METHODS, CIRCUITS AND OPTICAL CABLE ASSEMBLIES FOR OPTICAL TRANSMISSION OF HIGH-SPEED DATA AND LOW-SPEED DATA

(71) Applicant: Corning Optical Communications LLC, Hickory, NC (US)

(72) Inventor: Richard Clayton Walker, Palo Alto, CA (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/063,617

(22) Filed: Mar. 8, 2016

(65) Prior Publication Data
US 2016/0191171 A1 Jun. 30, 2016

Related U.S. Application Data

(63) Continuation of application No. PCT/US2014/054192, filed on Sep. 5, 2014.

(60) Provisional application No. 61/877,546, filed on Sep. 13, 2013.

(51) Int. Cl.
*H04B 10/564* (2013.01)
*H04B 10/50* (2013.01)
(Continued)

(52) U.S. Cl.
CPC ......... *H04B 10/564* (2013.01); *H04B 10/503* (2013.01); *H04B 10/516* (2013.01);
(Continued)

(58) Field of Classification Search
CPC .. H04B 10/564; H04B 10/503; H04B 10/516; H04B 10/5161; H04B 10/541; H04B 10/66; H04B 2210/074
See application file for complete search history.

(56) References Cited

U.S. PATENT DOCUMENTS 4,763,326 A   8/1988  Krick
5,050,176 A   9/1991  Naito et al.
(Continued)

FOREIGN PATENT DOCUMENTS

JP       2114742       4/1990
WO   03023917 A1    3/2003

OTHER PUBLICATIONS

Patent Cooperation Treaty, International Search Report and Written Opinion for PCT/US14/54192, mail date Dec. 3, 2014, 14 pages.

*Primary Examiner* — Leslie Pascal
(74) *Attorney, Agent, or Firm* — Michael E. Carroll, Jr.

(57) ABSTRACT

Methods, circuits and active optical cable assemblies for simultaneous transmission of low-speed optical data and high-speed optical data over an optical fiber link are disclosed. In one embodiment, a method of optical communication includes controlling a laser such that an output of the laser transmits high-speed optical data at a first bit rate, and modulating an amplitude of the output of the laser such that the laser transmits low-speed optical data at a second bit rate simultaneously with the high-speed optical data. In another embodiment, a circuit for providing optical communication includes a laser and a laser driver circuit that digitally modulates an output of the laser to transmit high-speed optical data at a first bit rate. The circuit further includes an amplitude modulation circuit that modulates an amplitude of the laser to transmit low-speed optical data at a second bit rate simultaneously with the high-speed optical data.

20 Claims, 10 Drawing Sheets

(51) Int. Cl.
H04B 10/516 (2013.01)
H04B 10/54 (2013.01)
H04B 10/66 (2013.01)

(52) U.S. Cl.
CPC ....... H04B 10/5161 (2013.01); H04B 10/541 (2013.01); H04B 10/66 (2013.01); H04B 2210/074 (2013.01)

(56) References Cited

U.S. PATENT DOCUMENTS

| | | | |
|---|---|---|---|
| 5,812,297 | A | 9/1998 | Mussino et al. |
| 6,366,373 | B1 | 4/2002 | MacKinnon et al. |
| 6,788,868 | B2 | 9/2004 | McLain et al. |
| 7,154,923 | B2 | 12/2006 | Kucharski |
| 7,215,891 | B1 | 5/2007 | Chiang et al. |
| 7,505,694 | B2 | 3/2009 | Johnson et al. |
| 7,826,739 | B2 | 11/2010 | Nelson et al. |
| 7,869,473 | B2 | 1/2011 | Ye et al. |
| 8,442,375 | B2 | 5/2013 | Bylander et al. |
| 9,304,265 | B2 | 4/2016 | Isenhour et al. |
| 2005/0089334 | A1 | 4/2005 | Regev et al. |
| 2005/0232635 | A1 | 10/2005 | Aronson et al. |
| 2010/0054733 | A1 | 3/2010 | Hosking |
| 2010/0095110 | A1 | 4/2010 | Noble et al. |
| 2012/0170927 | A1 | 7/2012 | Huang et al. |
| 2013/0089290 | A1 | 4/2013 | Sloey et al. |
| 2013/0136401 | A1 | 5/2013 | Cooke et al. |
| 2013/0195406 | A1 | 8/2013 | Cooke et al. |
| 2013/0322824 | A1 | 12/2013 | Isenhour et al. |
| 2016/0109660 | A1 | 4/2016 | Fortusini et al. |

METHODS, CIRCUITS AND OPTICAL CABLE ASSEMBLIES FOR OPTICAL TRANSMISSION OF HIGH-SPEED DATA AND LOW-SPEED DATA

PRIORITY APPLICATION

This application is a continuation of International Application No. PCT/US14/54192, filed on Sep. 5, 2014, which claims the benefit of priority under 35 U.S.C. §119 of U.S. Provisional Application Ser. No. 61/877,546, filed on Sep. 13, 2013, the content of which is relied upon and incorporated herein by reference in its entirety.

BACKGROUND

Field

The present disclosure generally relates to optical communication and, more particularly, methods, circuits and active optical cable assemblies for simultaneous optical transmission of high-speed and low-speed data.

Technical Background

Benefits of optical fiber include extremely wide bandwidth and low noise operation. Because of these advantages, optical fiber is increasingly being used for a variety of applications, including, but not limited to, broadband voice, video, and data transmission. Additionally, optical cable assemblies may be utilized in consumer electronics applications to transfer data between electronic devices.

Some data transmission interfaces require low-speed data (e.g., telemetry data) to be transmitted simultaneously with high-speed data (e.g., up to 10 Gb/s and beyond). However, the additional low-speed data require an additional transmission medium, such as copper conductors or additional optical fibers. The additional transmission medium may increase the diameter of the optical cable, and, in the case of copper conductors, require DC isolation between ends of the optical cable as well as provide additional shielding requirements due to electro-magnetic interference concerns. Additional optical fibers for low-speed transmission may increase the cost of the optical cable.

SUMMARY

Embodiments are directed to simultaneous transmission of high-speed data and low-speed data across one or more optical fibers without the need for additional optical fibers or bulky electrical conductors. More specifically, embodiments enable transmission of out-of-band signals across an optical fiber by simultaneously modulating the amplitude of a laser to transmit low-speed optical data while digitally modulating the laser to transmit high-speed optical data. Accordingly, embodiments add an extra digital low-speed signaling path to an existing high-speed fiber optic link in a manner that conveniently carries signals normally transported over multiple copper pairs or a combination of copper pairs and optical fibers.

In one embodiment, a method of optical communication includes controlling a laser such that an output of the laser transmits high-speed optical data at a first bit rate, and modulating an amplitude of the output of the laser such that the laser transmits low-speed optical data at a second bit rate simultaneously with the high-speed optical data. The first bit rate is higher than the second bit rate.

In another embodiment, a circuit for providing optical communication includes a laser and a laser driver circuit that digitally modulates an output of the laser to transmit high-speed optical data at a first bit rate. The circuit further includes an amplitude modulation circuit that modulates an amplitude of the laser to transmit low-speed optical data at a second bit rate simultaneously with the high-speed optical data. The first bit rate is higher than the second bit rate.

In yet another embodiment, an active optical cable assembly includes an optical fiber having a first end, a first electrical connector at the first end of the optical fiber and a laser within the first electrical connector. The active optical cable assembly further includes a laser driver circuit within the first electrical connector that digitally modulates an output of the laser to transmit high-speed optical data at a first bit rate over the optical fiber in accordance with a high-speed data stream received at the first electrical connector. The active optical cable assembly also includes an amplitude modulation circuit within the first electrical connector that modulates an amplitude of the laser to transmit low-speed optical data at a second bit rate simultaneously with the high-speed optical data over the optical fiber in accordance with a low-speed data stream received at the first electrical connector. The first bit rate is higher than the second bit rate.

Additional features and advantages will be set forth in the detailed description which follows, and in part will be readily apparent to those skilled in the art from that description or recognized by practicing the embodiments as described herein, including the detailed description which follows, the claims, as well as the appended drawings.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Figure 1:
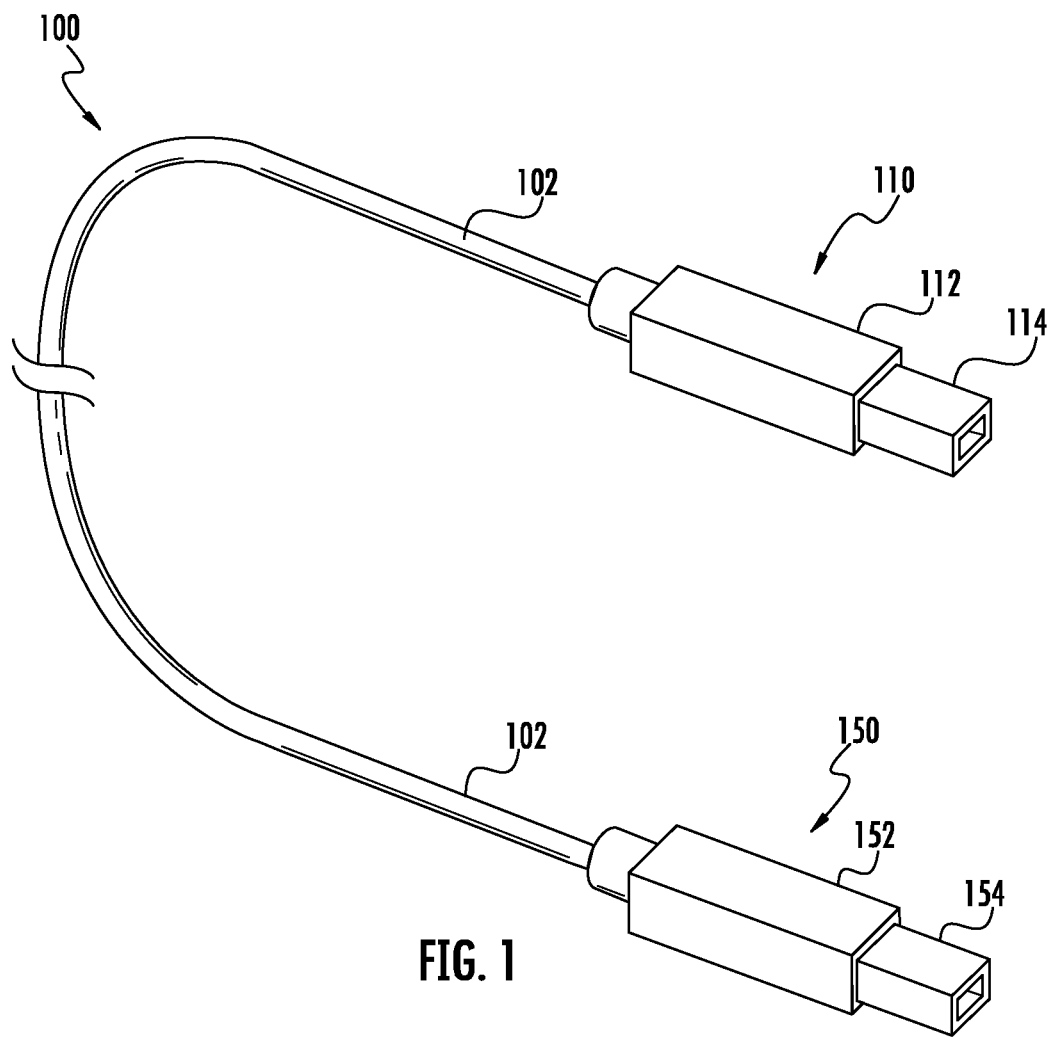
FIG. 1 depicts an example active optical cable assembly according to one or more embodiments described and illustrated herein.

Embodiments of the present disclosure are directed to methods, circuits and active optical cable assemblies for simultaneous transmission of high-speed data and low-speed data across one or more optical fibers. Embodiments described herein enable transmission of the high-speed data and low-speed data without the need for additional optical fibers or bulky electrical conductors. More specifically, embodiments enable transmission of out-of-band control signals across an optical fiber by simultaneously modulating the amplitude of a laser to transmit low-speed control data while digitally modulating the laser to transmit high-speed data. Accordingly, embodiments add an extra digital low-speed signaling path to an existing high-speed fiber optic link in a manner that conveniently carries signals normally transported over multiple copper pairs or a combination of copper pairs and optical fibers.

Traditional laser transceivers digitally modulate the power of the output of a laser to encode ones and zeros on the optical fiber. The optical power is received at a receiving end of the fiber optic link in a binary manner such that any power in excess of the average power is considered a logical "one" and any power below the average is considered a logical "zero." Typical laser drivers utilize two current sources. The first current source is a fixed current source that biases the laser into an operating region such that the laser provided a desired average power. The second current source is switchable. When the second current source is switched to add to the first current source, the resulting increased optical power of the laser produces a logical one. When the second current source is switched to subtract from the first current source, the resulting decreased optical power produces a logical zero.

In the embodiments described herein, the current value of the second current source is configured to change slowly over time such that a larger swing one and zero may be distinguishable from a smaller swing one and zero. Variations in the swing size of the amplitude of the output of the laser are used to encode low-speed data. This modulation of the amplitude of the output of the laser may then be received at a receiving end of the optical fiber link and converted into an electrical signal which is substantially proportional to the received optical signal swing. The resulting electrical low-speed data signal may then be processed by any technique for decoding the low-speed data.

The techniques disclosed herein may be implemented in any optical communications system wherein low-speed data (e.g., low-speed telemetry data) is utilized in conjunction with high-speed data transfer. Although embodiments are described herein in the context of active optical cable assemblies, embodiments are not limited thereto. As an example and not a limitation, the techniques described herein may be utilized in router devices to simultaneously transmit low-speed telemetry data and high-speed data over a fiber optic link without the need for additional optical fibers or electrical conductors.

Various embodiments of methods, circuits and active optical cable assemblies for transmitting high-speed optical data and low-speed optical data over an optical fiber are described in detail below.

Referring now to FIG. 1, an example active optical cable assembly 100 is illustrated. The active optical cable assembly 100 generally comprises a first connector assembly 110 (e.g., a host connector assembly for connecting to a host device), a fiber optic cable 102 having a first end and a second end, and a second connector assembly 150 (e.g., a client connector for connecting to a client device). The first connector assembly 110 includes a first connector body 112 and a first electrical connector 114 extending from a front face of the first connector body 112. Similarly, the second connector assembly 150 includes a second connector body 152 and a second electrical connector 154 extending from a front face of the second connector body 152. The first and second connector assemblies 110, 150 are coupled to one another by the fiber optic cable 102, which may include an outer jacket portion that surrounds one or more optical fibers (not shown in FIG. 1).

The active optical cable assembly 100 may be configured as a uni-directional cable (i.e., transmission of optical signals in one direction of the active optical cable assembly using a transmitter circuit at one end and a receiver circuit at the opposite end) or a bi-directional cable (i.e., transmission of optical signals in both directions of the active optical cable assembly using a transmitter circuit and a receiver circuit at both ends of the active optical cable assembly).

An electro-optical circuit is a circuit for converting an electrical signal (e.g., an electrical signal received from a host or client device) into an optical signal. An electro-optical circuit may include, but is not limited to, a laser (or other light-emitting device) and a laser driver circuit. An opto-electrical circuit is a circuit for converting an optical signal received on an optical fiber into an electrical signal. An opto-electrical circuit may include, but is not limited to, a photodiode and a transimpedance amplifier. A transceiver circuit is a circuit configured to both transmit and receive optical signals (e.g., for bi-directional communication).

The first connector body 112 and the second connector body 152 may enclose one or more opto-electrical circuits, one or more electro-optical circuits, or any combination of opto-electrical circuits and electro-optical circuits depending on how many channels are desired as well as the desired directionality (e.g., uni-directional or bi-directional). It is noted that although embodiments are described herein in the context of a uni-directional fiber link for simplicity, embodiments are not limited thereto. A bi-directional active optical cable assembly is easily constructed by using two or more optical fibers driving one or more extra optical fibers in an opposite direction with an identical cascade of circuits.

The active optical cable assembly 100 may be configured to be utilized in conjunction with a high-speed data transmission protocol also requiring transmission of low-speed data, such as low-speed telemetry data or low-speed control data. As an example and not a limitation, the active optical cable assembly 100 may be configured as a Thunderbolt™ active optical cable assembly configured to optically couple electronic devices in accordance with the Thunderbolt™ interface developed by Intel® Corp. of Santa Clara, Calif. It should be understood that the embodiments described herein are not limited to Thunderbolt™ applications.

The current Thunderbolt™ interface allows for high-speed data transfer up to 10 Gb/s. The Thunderbolt™ interface also requires a 1 Mb/s communication channel to allow both sides of the active optical cable assembly 100 to agree on which of the two high-speed channels are in use, or to manage power-down behavior in suspend modes. As stated above, the methods and circuits described herein allow for the low-speed data (e.g., the low-speed 1 Mb/s control data) to be transmitted simultaneously with the high-speed data (e.g., the up to 10 Gb/s data provided by the Thunderbolt™ interface) without the need for additional optical fibers, electrical conductors, shielding or complicated encoding and decoding circuitry.

Figure 2:
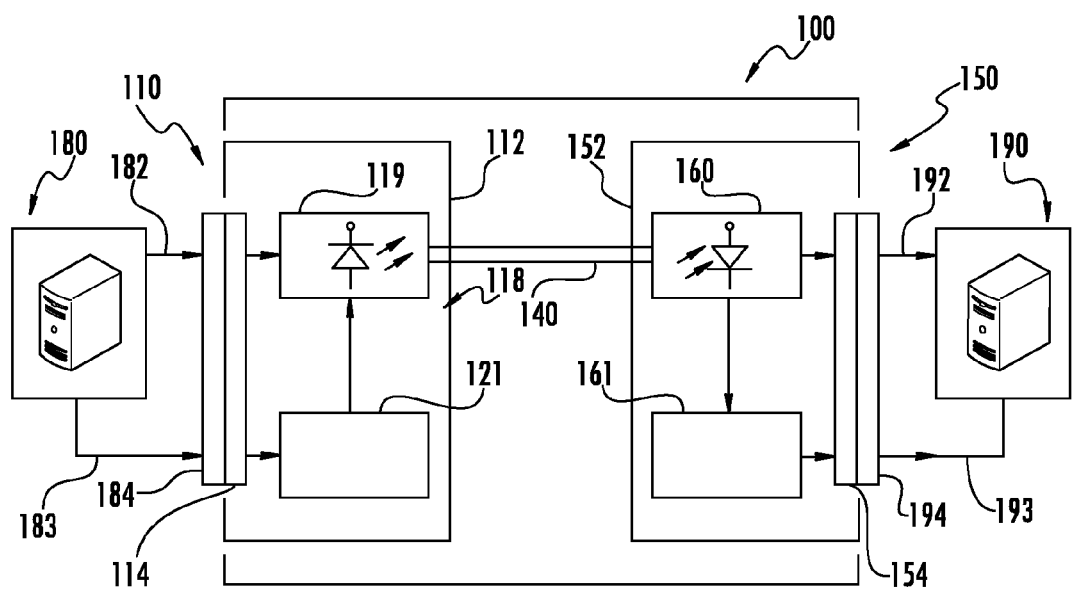
FIG. 2 schematically depicts internal components of an example active optical cable assembly for simultaneous optical transmission of high-speed optical data and low-speed optical data according to one or more embodiments described and illustrated herein.

Referring now to FIG. 2, components of an example active optical cable assembly 100 are schematically illustrated. It should be understood that the components illustrated in FIG. 2 may be implemented into devices other than active optical cable assemblies, such as communication modules within hardware devices.

The first electrical connector 114 is illustrated as being electrically connected to a first electrical connector 184 of a first electronic device 180 (e.g., a host device or hub), which may be any electronic device. The second electrical connector 154 is illustrated as being electrically connected to a second electrical connector 194 of a second electronic device 190 (e.g., a client device or end device), which may also be any electronic device. High-speed data is transmitted over electrical conductors 182 and 192 of the first and second electronic devices 180, 190, respectively. Low-speed data is transmitted over electrical conductors 183 and 193 of the first and second electronic devices 180, 190, respectively.

Included in the first connector body 112 is a circuit 118 comprising a laser and laser driver circuit 119 and an amplitude modulation circuit 121. Included in the second connector body 152 are a receiver circuit 160 and an amplitude detector circuit 161. The laser and the receiver circuit 160 are optically coupled by an optical fiber 140. High-speed data provided by the first electronic device 180 is provided to the laser and laser driver circuit 119 over electrical conductor 182 and electrical connectors 184 and 114. The laser of the laser and laser driver circuit 119 transmits high-speed optical data over the optical fiber 140 at a first bit rate. The output of the laser is digitally modulated to produce the high-speed optical data. A high optical power value $P_H$ that is above a threshold value (e.g., an average optical power value $P_{AVG}$ produced by a bias current applied to the laser) provides a logical one or "high" digital value, while a low optical power value $P_L$ that is below the threshold value provides a logical zero or "low" digital value.

The high-speed optical data transmitted by the laser of the laser and laser driver circuit 119 is received by the receiver circuit 160 over the optical fiber 140. The receiver circuit 160 may include a photodiode and a transimpedance amplifier, as described in more detail below. The receiver circuit 160 converts the optical signal into a corresponding input electrical signal to thereby convert the high-speed optical data into corresponding high-speed electrical data. The high-speed electrical data is then provided to the second electronic device 190 over electrical connectors 154 and 194 and electrical conductor 193.

As stated above, embodiments of the present disclosure also modulate the amplitude of the laser output to transmit an out-of-band low-speed optical data stream at a second bit rate that is less than the first bit rate of the high-speed optical data stream. The pre-encoded low-speed optical data is sent across the optical fiber 140 without having to understand the protocol in any way. As such, the low-speed optical data is protocol agnostic. Still referring to FIG. 2, the amplitude modulation circuit 121 receives low-speed electrical data from the first electronic device 180 via electrical conductor 183 and electrical connectors 184, 114. The amplitude modulation circuit 121 modulates the amplitude of the laser output in accordance with the received low-speed electrical data to transmit low-speed optical data over the optical fiber 140.

The amplitude detector circuit 161 receives the input electrical signal from the receiver circuit 160. The input electrical signal has a modulated amplitude that corresponds to the modulated amplitude of the optical signal produced by the laser. The input electrical signal comprises a low-speed electrical data component defined by the modulated amplitude, and a high-speed electrical data component defined by the digital modulation of the laser. The amplitude detector circuit 161 detects the modulated amplitude of the input electrical signal and may produce a low-speed electrical signal that is provided to the second electronic device 190 over the electrical connectors 154, 194 and electrical conductor 193. The amplitude detector circuit 161 creates a digital low-speed electrical signal that corresponds to the modulated amplitude of the laser output.

Accordingly, the low-speed information present on electrical conductor 183 is converted to amplitude variations on the optical fiber 140, which are then converted back into a digital signal by the receiver circuit 160 and the amplitude detector circuit 161 and provided to the second electronic device on electrical connectors 154, 194 and electrical conductor 193.

Figure 3:
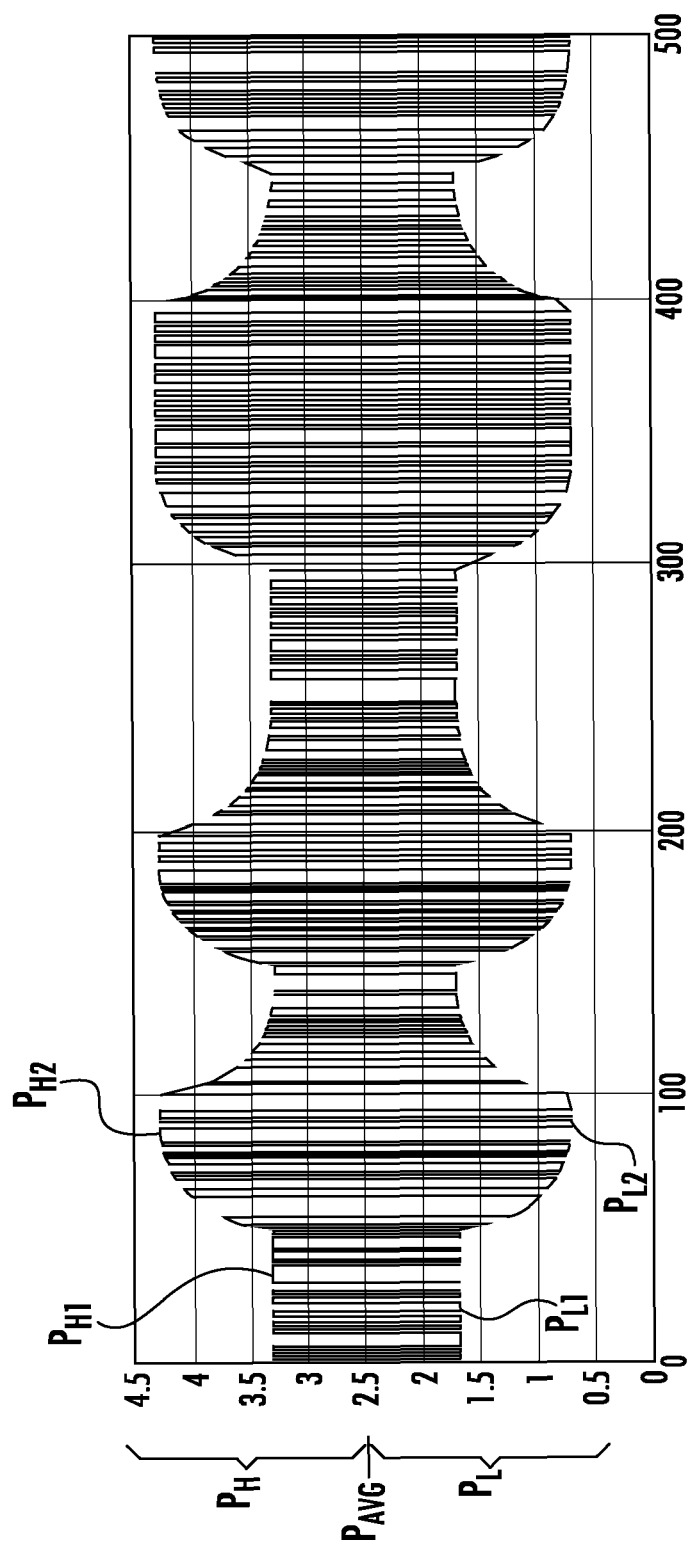
FIG. 3 graphically depicts an example output of a laser wherein the output is digitally modulated for transmission of high-speed optical data and amplitude modulated for transmission of low-speed optical data according to one or more embodiments described and illustrated herein.

FIG. 3 depicts an example plot of the optical power of a laser modulated by the laser and laser driver circuit 119 and the amplitude modulation circuit 121 depicted in FIG. 2. The vertical axis of the plot is normalized optical power, while the horizontal axis is time. No limitations are intended by the normalized optical values in the vertical axis. Further, it should be understood that the plot depicted in FIG. 3 is for illustrative purposes only.

The laser is provided with a bias current $I_B$ such that it emits an average optical power value $P_{AVG}$. In the illustrated embodiment, the average optical power value $P_{AVG}$ is 2.5 units. The output of the laser is digitally modulated to produce high-speed optical data, which is illustrated as the fast and short transitions of optical power. When a drive current $I_D$ is added to the bias current $I_B$, the optical power of the laser increases to a high optical power value $P_H$ that is greater than the average optical power value $P_{AVG}$ to provide a logical one. When the drive current $I_D$ is subtracted from the bias current $I_B$, the optical power of the laser decreases to a low optical power value $P_L$ that is less than the average optical power value $P_{AVG}$ to provide a logical zero Additionally, low-speed information is simultaneous transmitted by the laser by the low-speed variation of the amplitude of the laser output. The amplitude of the output of the laser may be modulated by varying the drive current $I_D$ that is added to and subtracted from the bias current bias current $I_B$. By increasing and decreasing the amount of drive current $I_D$, the amplitude of the laser output is modulated such that a larger swing one and zero may be distinguishable from a smaller swing one and zero As shown in FIG. 3, when the amount of drive current $I_D$ applied to the laser is reduced, a first high optical power value $P_{H1}$ and a first low optical power value $P_{L1}$ is outputted depending on the high-speed digital modulation of the laser. A first high optical power value $P_{H1}$ or a first low optical power value $P_{L1}$ provides a logical zero of the low-speed optical data. When the amount of drive current $I_D$ applied to the laser is increased, a second high optical power value $P_{H2}$ and a second low optical power value $P_{L2}$ is outputted depending on the high-speed digital modulation of the laser. A second high optical power value $P_{H2}$ or a second low optical power value $P_{L2}$ provides a logical one of the low-speed optical data. As described in more detail below, the low-speed amplitude variations may be detected by the receiver circuit 160 and the amplitude detector circuit 161.

Figure 4:
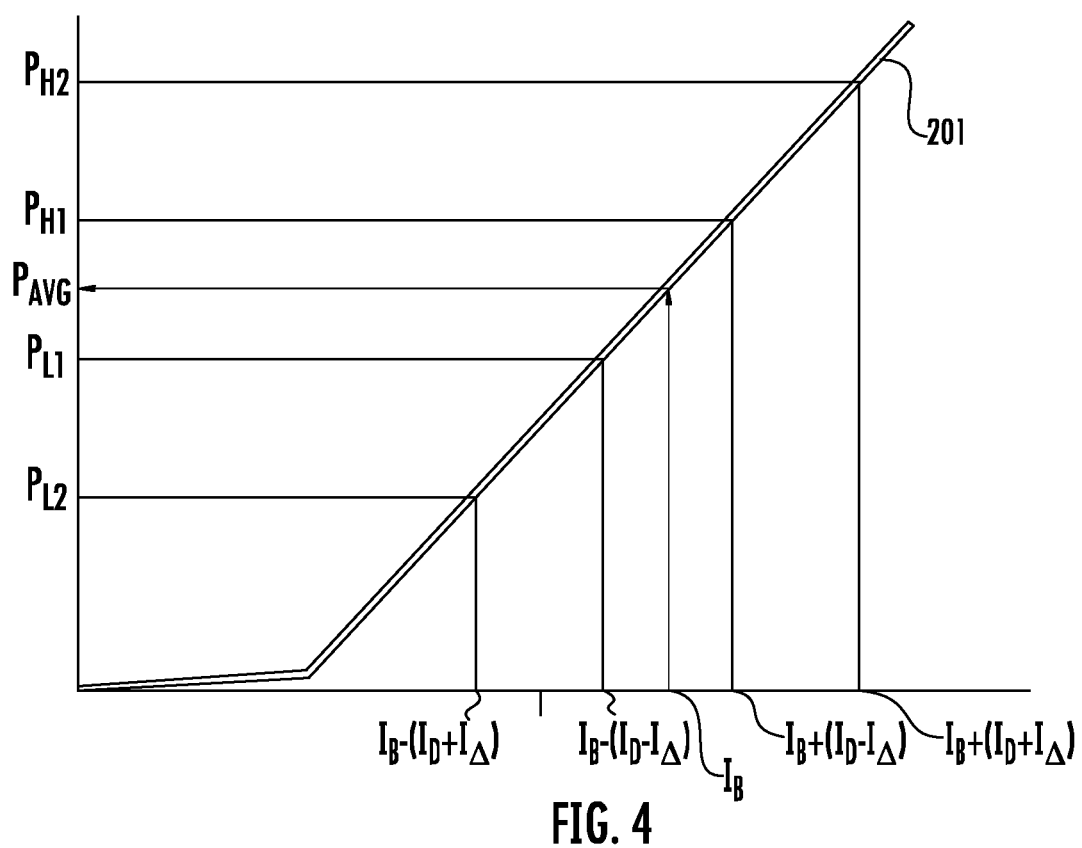
FIG. 4 graphically depicts a laser diode transfer function according to different laser driver currents applied to a laser according to one or more embodiments described and illustrated herein.

In embodiments, the amount of drive current $I_D$ applied to the laser may be varied by adding and removing a delta current $I_A$ to and from the drive current $I_D$. In this manner, the drive current $I_D$ is modulated by the delta current $I_A$. FIG. 4 illustrates the operation of a laser and a laser driver circuit 119 according to one or more embodiments of the present disclosure. A laser diode transfer function 201 is plotted with the x-axis showing the laser driver current $I_{LD}$ and the y-axis providing the laser optical output power. An average bias current $I_B$ is chosen for the laser to generate a desired average optical output power $P_{AVG}$. In addition to applying and subtracting a drive current $I_D$ to and from the bias current $I_B$, the delta current $I_A$ is added and removed to and from the drive current $I_D$ in accordance with a low-speed data stream. A low-speed logical one is transmitted when the delta current $I_A$ is added to the drive current $I_D$. A low-speed logical zero is transmitted when the delta current $I_A$ is removed from the drive current $I_D$. A summary of the laser driver current $I_{LD}$ applied to the laser for simultaneous transmission of high-speed data and low-speed data is provided in Table 1 below.

TABLE 1

| High-Speed and Low-Speed Data | Driver Current Applied to Laser ($I_{LD}$) | Laser Optical Output Power Value |
|---|---|---|
| High-Speed Logical One Low-Speed Logical One | $I_B + (I_D + I_A)$ | $P_{H2}$ |
| High-Speed Logical One Low-Speed Logical Zero | $I_B + (I_D + I_A)$ | $P_{H1}$ |
| High-Speed Logical Zero Low-Speed Logical Zero | $I_B - (I_D + I_A)$ | $P_{L1}$ |
| High-Speed Logical Zero Low-Speed Logical One | $I_B - (I_D + I_A)$ | $P_{L2}$ |

It should be understood that the amplitude of the output power of the laser may be modulated in a manner other than the addition and removal of the delta current $I_A$. Any current source may be utilized to provide a variable drive current $I_D$.

FIGS. 5A-5D schematically depict an example circuit 118 for modulating a laser for transmission of high-speed optical data and low-speed optical data. It should be understood that the circuit 118 depicted in FIGS. 5A-5D are for illustrative purposes only, and that other laser driver circuits may be utilized to drive the laser as described herein. The circuit 118 depicted in FIGS. 5A-5D is a DC-coupled circuit using bipolar transistors, but it should be understood that AC-coupled circuits and circuits using CMOS transistor or other types of active devices may be utilized. The example circuit 118 depicted in FIGS. 5A-5D may be made up of discrete components, or be provided in an integrated circuit, such as an application-specific integrated circuit ("ASIC").

Figure 5A:
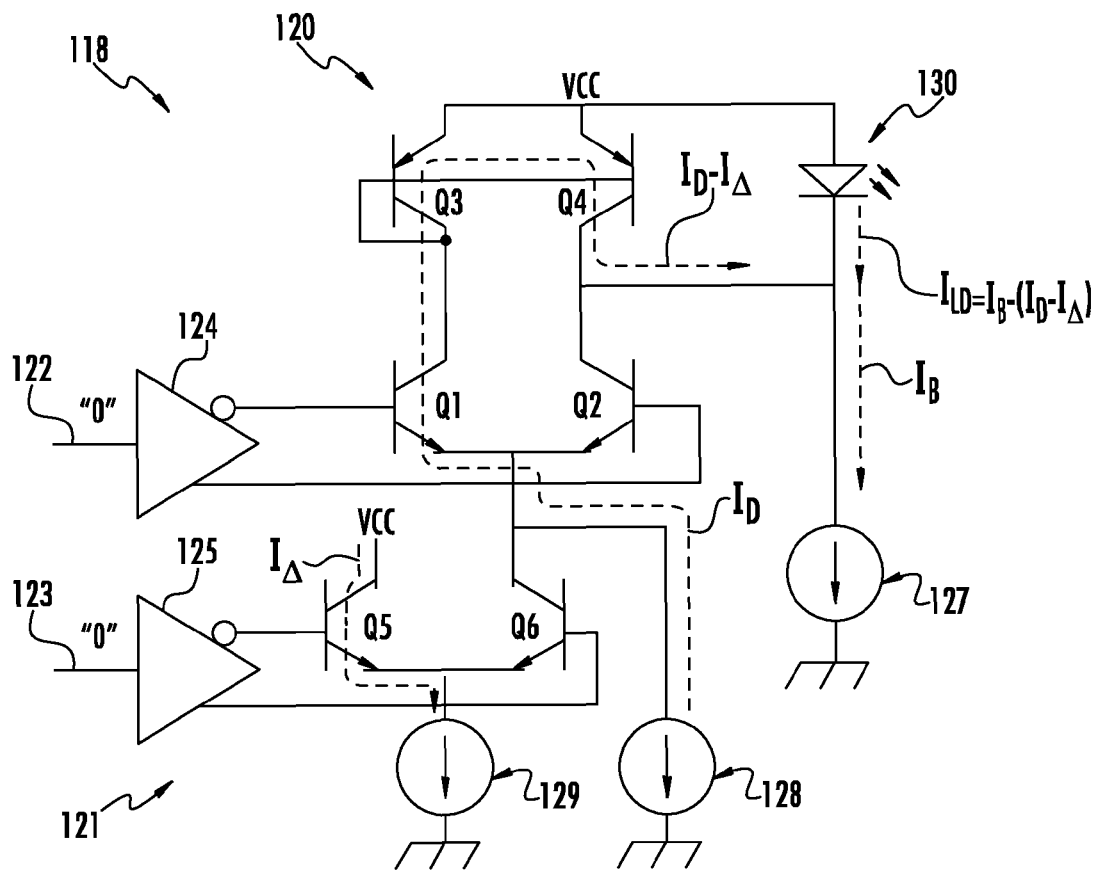
FIGS. 5A-5D schematically depict four operational states of an example circuit for simultaneous digital modulation and amplitude modulation of a laser to transmit high-speed optical data and low-speed optical data according to one or more embodiments described and illustrated herein.

Referring first to FIG. 5A, the circuit 118 generally comprises a laser 130, a laser driver circuit 120, and the amplitude modulation circuit 121 depicted in FIG. 2. The circuit 118 further includes a bias current source 127 that produces a bias current $I_B$, a drive current source 128 that produces a drive current $I_D$, and a delta current source 129 that produces a delta current $I_A$. The drive current source 128 is switched at a high frequency in accordance with a high-speed data stream provided on high-speed signal line 122. The delta current source 129 is switched at a lower frequency in accordance with a low-speed data stream provided on low-speed signal line 123.

The high-speed data stream is provided as an input to a first buffer 124 having its output electrically coupled to transistors Q1 and Q2. The laser driver circuit 120 comprises transistors Q1, Q2, Q3 and Q4 that are arranged to form a current mirror that is electrically coupled to supply voltage VCC, the drive current source 128, and the laser 130. The laser driver circuit 120 further includes the first buffer 124, the bias current source 127 and the drive current source 128. The collectors of transistors Q4 and Q2 are coupled to the cathode of the laser 130. Depending on the high-speed data stream, the current mirror either adds or removes the drive current $I_D$ to or from the bias current $I_B$ applied to the laser 130.

The low-speed data stream is provided as an input to a second buffer 125 having its output electrically coupled to a current switch defined by transistors Q5 and Q6. The second buffer 125, transistor Q5, transistor Q6 and the delta current source 129 define the amplitude modulation circuit 121. The collector of transistor Q5 is coupled to VCC, while its emitter is coupled to the delta current source 129 and the emitter of transistor Q6. The collector of transistor Q6 is coupled to the emitters of transistors Q1 and Q2 and the drive current source 128. Depending on the low-speed data stream, transistors Q5 and Q6 either add or remove the delta current $I_A$ to or from the drive current $I_D$.

FIG. 5A depicts the circuit 118 in an operating state wherein the high-speed data stream inputs a logical zero (i.e., a low voltage) and the low-speed data stream also inputs a logical zero. In this state, transistor Q1 is on and transistor Q2 is off. This causes the drive current $I_D$ generated by drive current source 128 to flow through transistor Q3 where it is mirrored by transistor Q4. This causes the drive current $I_D$ to be forced into the cathode of the laser 130. This mirrored current absorbs a portion of the bias current $I_B$.

The logical zero of the low-speed data stream turns on transistor Q5 and turns off transistor Q6. In this operating state, the delta current $I_A$ generated by the delta current source 129 is switched into VCC, and therefore it is subtracted from the drive current $I_D$. Therefore, the laser 130 is driven by a laser driver current $I_{LD}$ equal to $I_B-(I_D-I_A)$, which produces a laser output power value equal to first low optical power value $P_{L1}$ (see FIG. 3).

Figure 5B:
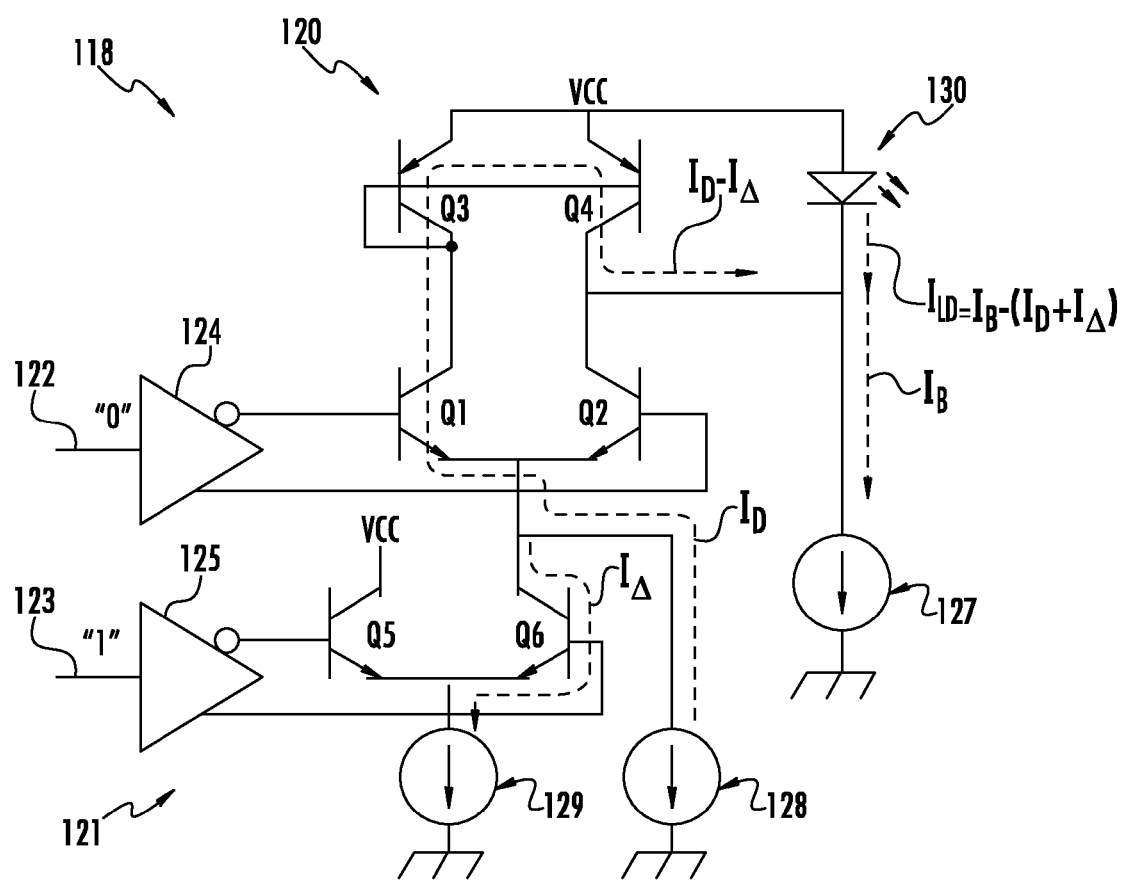

FIG. 5B depicts the circuit 118 in an operating state wherein the high-speed data stream inputs a logical zero but now the low-speed data stream inputs a logical one (i.e., a high voltage). In this state, transistor Q1 is on and transistor Q2 is off, as described above with respect to FIG. 5A. This causes the drive current $I_D$ generated by drive current source 128 to flow through transistor Q3 where it is mirrored by transistor Q4. This causes the drive current $I_D$ to be forced into the cathode of the laser 130.

The logical one of the low-speed input stream turns off transistor Q5 and turns on transistor Q6, which causes the delta current $I_A$ generated by the delta current source 129 to be added to the drive current $I_D$. Therefore, the laser 130 is driven by a laser driver current $I_{LD}$ equal to $I_B-(I_D+I_A)$, which produces a laser output power value equal to the second low optical power value $P_{L2}$ (see FIG. 3).

Figure 5C:
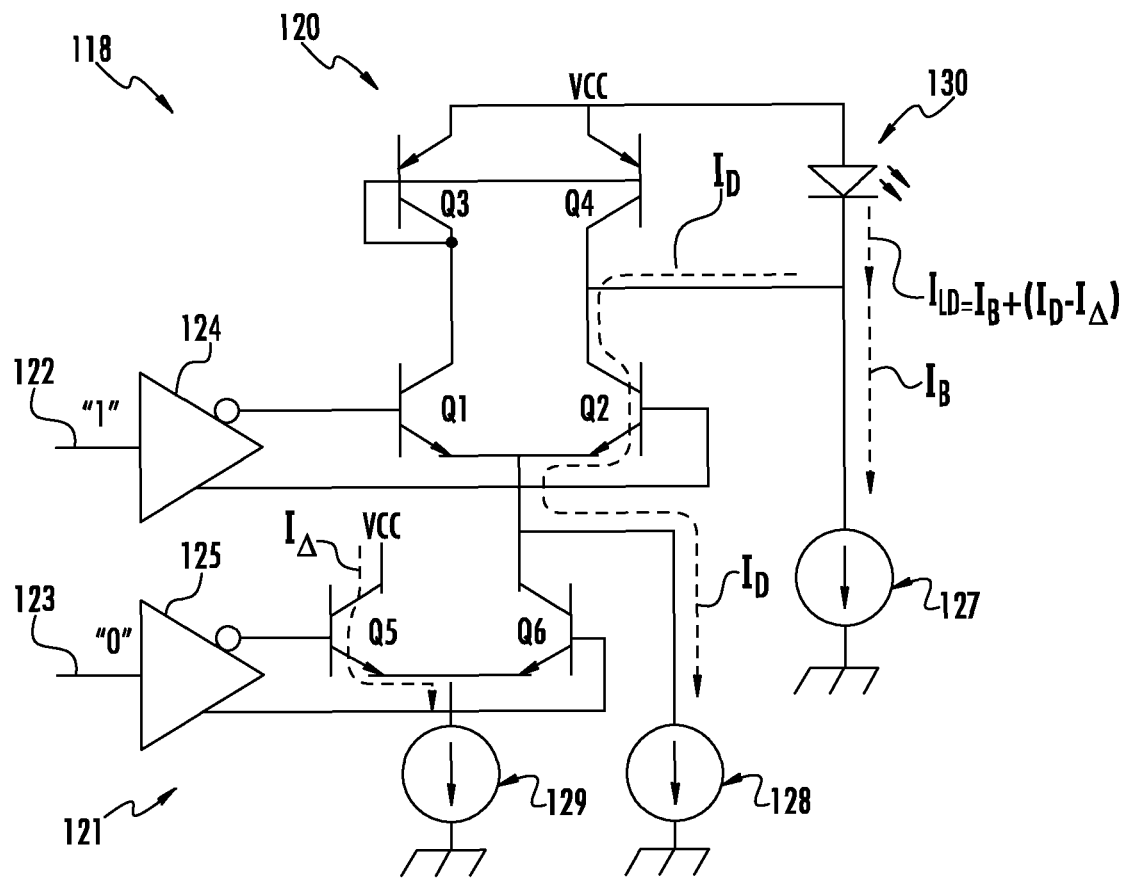

FIG. 5C depicts the circuit 118 in an operating state wherein the high-speed data stream inputs a logical one and the low-speed data stream inputs a logical zero. In this state, the logical one of the high-speed data stream causes transistor Q1, Q3 and Q4 to turn off and transistor Q2 to turn on. The drive current $I_D$ is steered through transistor Q2 where it is pulled out of the cathode of the laser 130. In this manner, the drive current $I_D$ is added to the bias current $I_B$.

The logical zero of the low-speed data stream turns on transistor Q5 and turns off transistor Q6. In this operating state, the delta current $I_A$ is switched into VCC and is subtracted from the drive current $I_D$. Therefore, the laser 130 is driven by a laser driver current $I_{LD}$ equal to $I_B+(I_D-I_A)$, which produces a laser output power value of first high optical power value $P_{H1}$ (see FIG. 3).

Figure 5D:
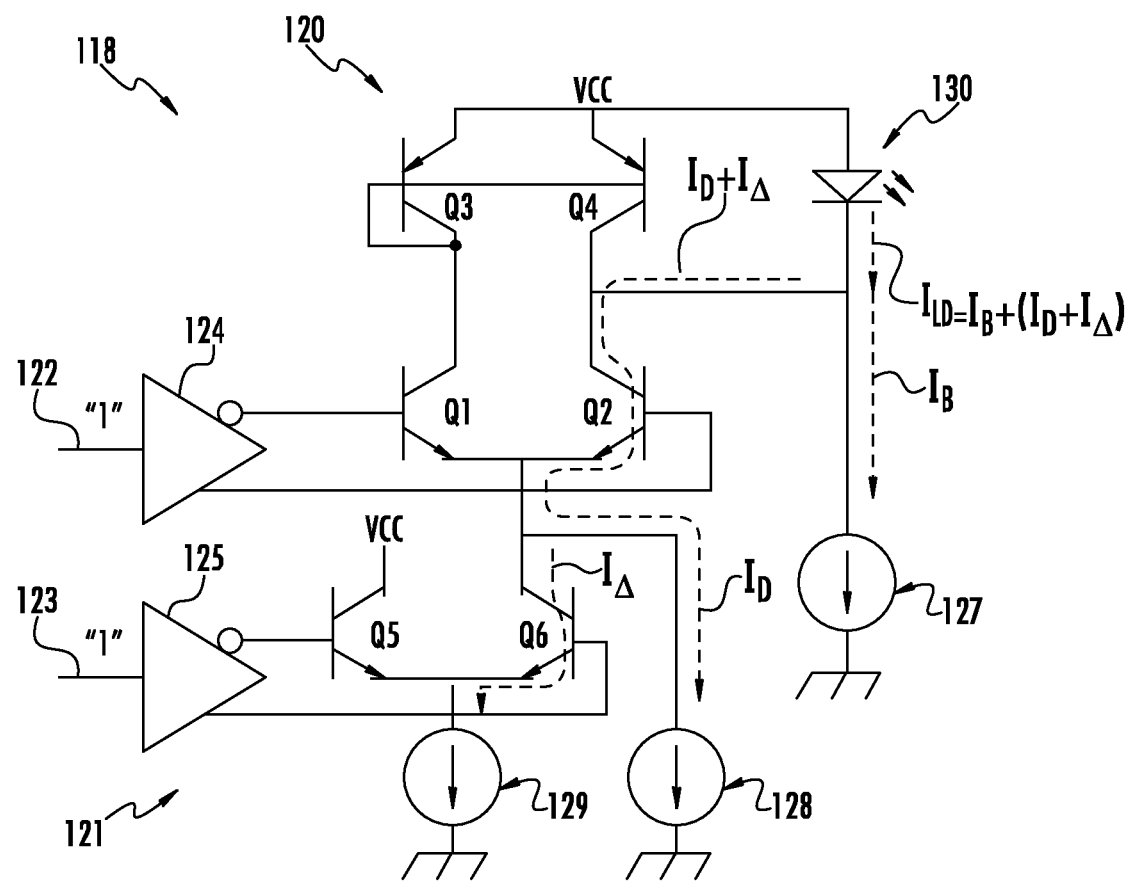

FIG. 5D depicts the circuit 118 in an operating state wherein both the high-speed data stream and the low-speed data stream input a logical one. The drive current $I_D$ is steered through transistor Q2 where it is pulled out of the cathode of the laser 130. In this manner, the drive current $I_D$ is added to the bias current $I_B$. As shown in FIG. 5B, the logical one of the low-speed input stream turns off transistor Q5 and turns on transistor Q6, which causes the delta current $I_A$ generated by the delta current source 129 to be added to the drive current $I_D$. In this state, the laser 130 is driven by a laser driver current equal to $I_B+(I_D+I_A)$, which produces a laser output power value equal to the second high optical power value $P_{H2}$ (see FIG. 3).

Accordingly, when the low-speed data stream is high, the delta current $I_A$ is added to the drive current $I_D$. When the high-speed data stream is switched, the laser driver current $I_{LD}$ alternates between $I_B+(I_D+I_A)$ and $I_B-(I_D+I_A)$. When the low-speed data stream is low, the delta current $I_A$ is switched into VCC. When the high-speed data stream is switched, laser driver current $I_{LD}$ alternates between $I_B-(I_D+I_A)$ and $I_B-(I_D-I_A)$. In this manner, the low-speed data stream causes an amplitude modulation on the high-speed data current swing.

The receiver circuit 160 and the amplitude detector circuit 161 (see FIG. 2) receives an optical signal in the form of the digitally modulated and amplitude modulated output of the laser. The output of the laser contains the high-speed optical data and the low-speed optical data. The receiver circuit 160 and the amplitude detector circuit 161 convert the output of the laser into an input electrical signal that includes the high-speed data and the low-speed data. The input electrical signal may then be decoded to generate high-speed electrical data and low-speed electrical data that corresponds to the high-speed optical data and the low-speed optical data, respectively. The high-speed electrical data and the low-speed electrical data may be transmitted to the second electronic device 190 for further processing.

Figure 6:
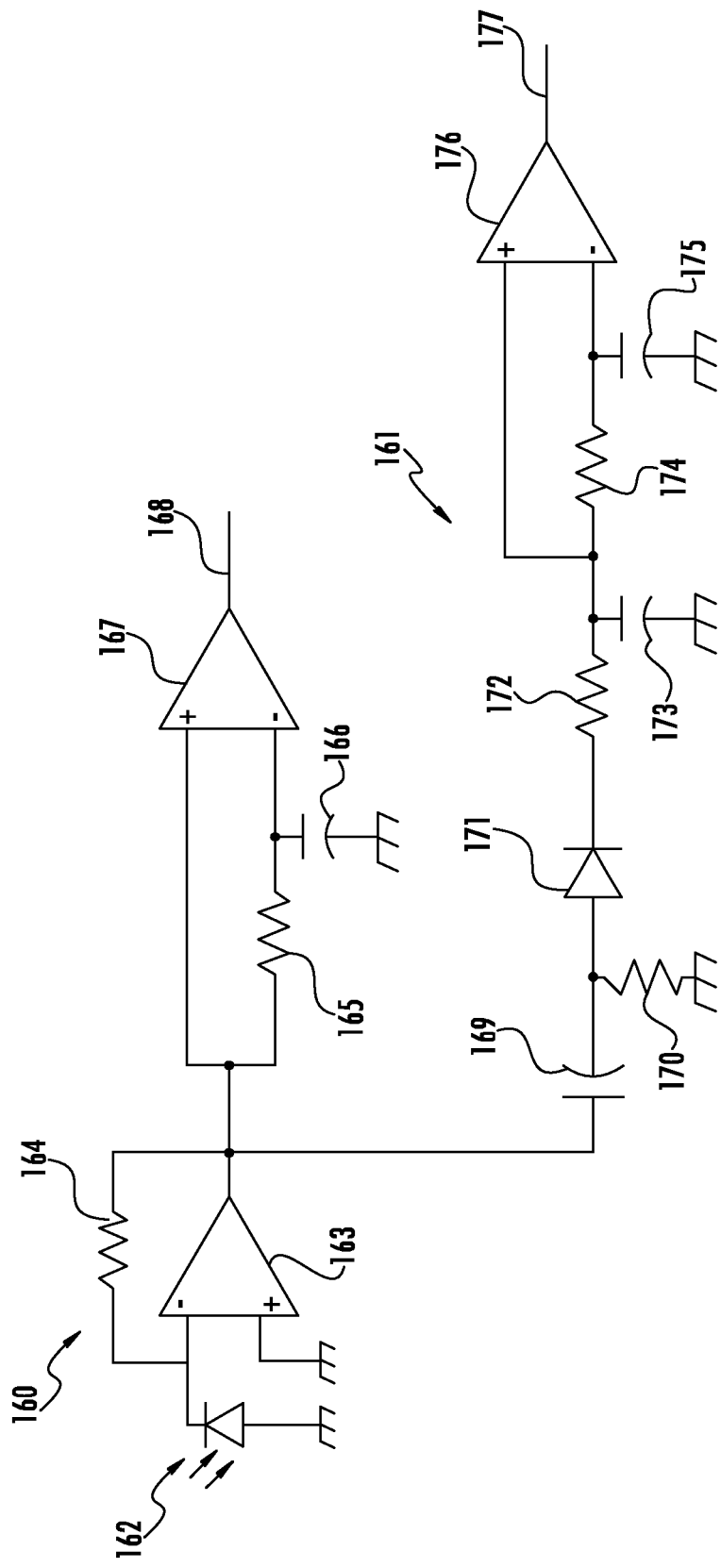
FIG. 6 schematically depicts an example receiver circuit and an example amplitude detection circuit for generating high-speed electrical data and low-speed electrical data from an optical signal transmitted by a laser according to one or more embodiments described and illustrated herein.

Referring now to FIG. 6, an example receiver circuit 160 and an example amplitude detector circuit 161 is schematically illustrated. The amplitude detector circuit 161 is electrically coupled the receiver circuit. It should be understood that the circuits depicted in FIG. 6 are for illustrative examples only, and that other circuit configurations may be utilized to convert the digitally modulated and amplitude modulated optical signal into high-speed electrical data and low-speed electrical data. The components of the receiver circuit 160 and the amplitude detector circuit 161 may be discrete components, or provided in an integrated circuit, such as an ASIC.

The receiver circuit 160 generally comprises a photodiode 162 (or other type of photodetector), a transimpedance amplifier circuit comprising operational amplifier 163 and feedback resistor 164, and a comparator circuit comprising operational amplifier 167. The receiver circuit 160 not only converts the output of the laser 130 into an input electrical signal, but also generates the high-speed electrical data, as described in detail below.

The photodiode 162 is optically coupled to the optical fiber 140 and receives the output of the laser 130. The photodiode 162 converts light received on the optical fiber 140 into an electrical signal which is provided to operational amplifier 163. Operational amplifier 163 and feedback resistor 164 produce an output voltage proportional to the received optical power of the output of the laser 130. This output voltage is referred to as the input electrical signal herein.

A low-pass circuit comprising resistor 165 and capacitor 166 extracts a voltage proportional to the average value of the received optical power (from the input electrical signal) and provides this voltage to the negative input of operational amplifier 167. The unfiltered input electrical signal outputted from operational amplifier 163 is provided to the positive input of operational amplifier 167. When the instantaneous voltage of the input electrical signal is greater than the average voltage, the output 168 of operational amplifier 167 indicates the reception of a logical one by producing a high output voltage (i.e., the high-speed electrical data is a logical one). Conversely, when the instantaneous voltage of the input electrical signal is below the average voltage, the output 168 of operational amplifier 167 indicates the reception of a logical zero by producing a low output voltage (i.e., the high-speed electrical data is a logical zero). In this manner, the high-speed electrical data may be generated from the optical output of the laser 130.

The amplitude detector circuit 161 and generation of the low-speed electrical data will now be described. The amplitude detector circuit 161 comprises an alternating current ("AC") coupling circuit comprising capacitor 169 and pull-down resistor 170. Capacitor 169 is coupled to the output of operational amplifier 163 and therefore receives the input electrical signal. The positive excursions of the input electrical signal are rectified by diode 171 and low-pass-filtered by a low-pass filter circuit comprising resistor 172 and capacitor 173 to produce a low-pass replica of the amplitude modulation envelope of the input electrical signal (the filtered input signal"). The average value of the amplitude modulation $V_{AVG}$ is generated by a low-pass filter circuit comprising resistor 174 and capacitor 173, and is provided to the negative input of operational amplifier 176 that is configured as a comparator.

Figure 7:
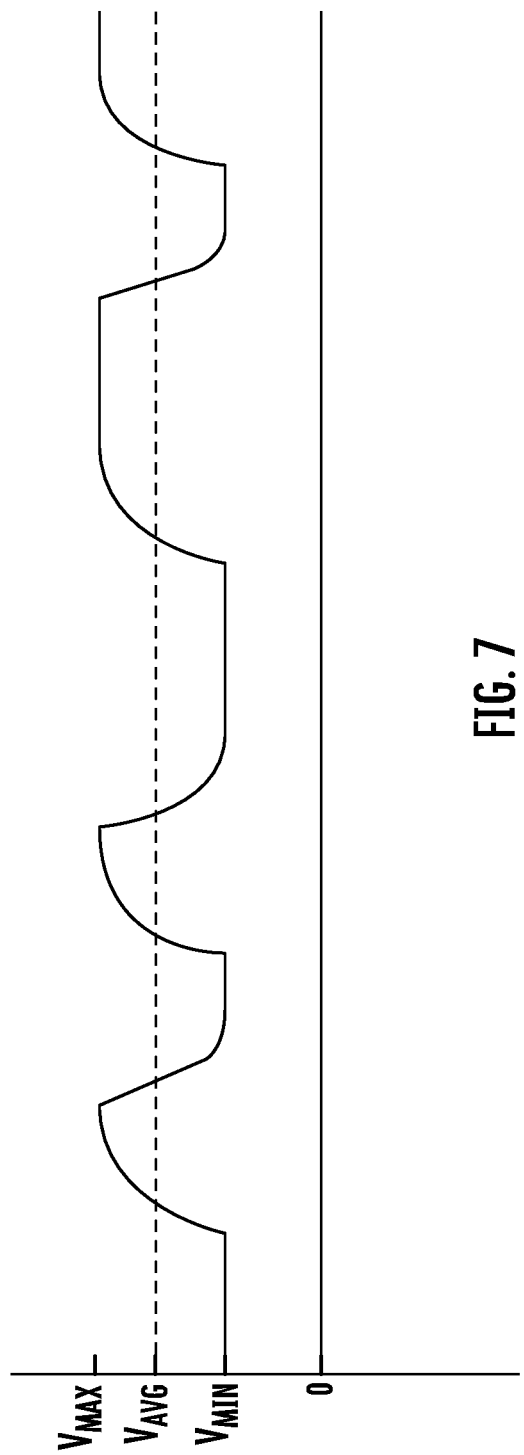
FIG. 7 graphically depicts an example electrical signal generated by the amplitude detection circuit illustrated in FIG. 6, wherein the example electrical signal includes the low-speed data corresponding to the amplitude modulation of the laser.

Referring briefly to FIG. 7, an example filtered input electrical of the optical signal depicted in FIG. 3 is graphically illustrated. The vertical axis is voltage and the horizontal axis is time. The high-speed modulation is filtered by resistor 172 and capacitor. Only positive excursions appear in the rectified signal. The filtered and rectified signal alternates between a minimum voltage $V_{MIN}$ (i.e., a low-speed data logical zero) and a maximum voltage $V_{MAX}$ (i.e., a low-speed data logical one). The average voltage $V_{AVG}$ is determined by resistor 174 and capacitor 175, as described above. This signal is then communicated to the negative input of operational amplifier 176. The average voltage $V_{AVG}$ is used as a reference voltage in the illustrated embodiment.

Referring once again to FIG. 6, the filtered input signal is communicated to the positive input of operational amplifier 176. When the instantaneous received filtered input electrical signal is greater than the average voltage $V_{AVG}$ of the filtered input electrical signal (e.g., the maximum voltage $V_{MAX}$), a high voltage (i.e., a logical one) is generated on the output 177 of operational amplifier 176 to signify the reception of a logical one on the low-speed signal line 123. When the instantaneous received filtered input electrical signal is less than the average voltage $V_{AVG}$ of the filtered input electrical signal (e.g., the minimum voltage $V_{MIN}$), a low voltage (i.e., a logical zero) is generated on the output 177 of operational amplifier 176 to signify a logical zero on the low-speed signal line 123. In this manner, the low-speed electrical data may be generated from the optical output of the laser 130 simultaneously with the generation of the high-speed electrical data.

It should now be understood that embodiments described herein are directed to methods, circuits and active optical cable assemblies for simultaneous transmission of high-speed data and low-speed data across one or more optical fibers. According to embodiments described herein, low-speed control signaling is managed separately from high-speed data, eliminating the need for complex, expensive digital multiplexing of two data streams. The amplitude modulation techniques reuse the same fiber or fibers already carrying high-speed data, eliminating the need for additional copper wires or extra fibers. Additionally, embodiments utilize the same laser and other optoelectronic components already carrying the high-speed data, thereby avoiding costs associated with driving additional optical links. The optical data transmission techniques described herein may be implemented modularly within an active optical cable assembly, allowing for easy interfacing with legacy connectors (e.g. high-definition multimedia interface, "HDMI") with no modification required to end devices. The techniques described herein may be made agnostic to control signal protocols, simplifying input/output design requirements for end equipment makers. In some embodiments, diagnostic data internal to the active optical cable assembly or transceiver can be added to the low-speed data signal without modification to end devices.

For the purposes of describing and defining the subject matter of the disclosure it is noted that the term "substantially" is utilized herein to represent the inherent degree of uncertainty that may be attributed to any quantitative comparison, value, measurement, or other representation.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the disclosure. Since modifications combinations, sub-combinations and variations of the disclosed embodiments incorporating the spirit and substance of the disclosure may occur to persons skilled in the art, the embodiments disclosed herein should be construed to include everything within the scope of the appended claims and their equivalents.

What is claimed is:

1. A method of optical communication, the method comprising:
   controlling a laser such that an output of the laser transmits high-speed optical data at a first bit rate; and
   modulating an amplitude of the output of the laser such that the laser transmits low-speed optical data at a second bit rate simultaneously with the high-speed optical data, wherein the first bit rate is higher than the second bit rate, wherein
   the laser is controlled by applying a laser driver current $I_{LD}$ to the laser, and
   the laser driver current $I_{LD}$ is modulated by adding and removing a drive current $I_D$ to and from a bias current $I_B$, and adding and removing a delta current $I_\Delta$ to and from the drive current $I_D$.

2. The method of claim 1, further comprising:
   receiving the output of the laser; and
   simultaneously detecting the high-speed optical data and the low-speed optical data.

3. The method of claim 1, further comprising converting the high-speed optical data into high-speed electrical data and the low-speed optical data into low-speed electrical data.

4. The method of claim 1, wherein:
   the high-speed optical data is defined by a high optical power value $P_H$ that is above a threshold and a low optical power value $P_L$ that is below the threshold; and
   the amplitude of the output of the laser is modulated at the second bit rate such that:
      the high optical power value $P_H$ is either a first high optical power value $P_{H1}$ or a second high optical power value $P_{H2}$ that is greater than the first high optical power value $P_{H1}$; and
      the low optical power value $P_L$ is either a first low optical power value $P_{L1}$ or a second low optical power value $P_{L2}$ that is less than the first low optical power value $P_{L1}$.

5. The method of claim 4, wherein:
   a logical one of the high-speed optical data is provided by the high optical power value $P_H$, and a logical zero of the high-speed optical data is provided by the low optical power value $P_L$; and
   a logical one of the low-speed optical data is provided by the second high optical power value $P_{H2}$ or the second low optical power value $P_{L2}$, and a logical zero of the low-speed optical data is provided by the first high optical power value $P_{H1}$ or the first low optical power value $P_{L1}$.

6. The method of claim 5, further comprising:
   receiving the output of the laser; and
   converting the output of the laser into an input electrical signal comprising a high-speed electrical data component and low-speed electrical data component corresponding to the high-speed optical data and the low-speed optical data, respectively.

7. The method of claim 6, further comprising decoding the low-speed electrical data component by applying a low-pass filter to the input electrical signal to filter out the high-speed electrical data component, and detecting logical ones and logical zeros of the low-speed electrical data component by comparing the low-pass filtered input electrical signal to an average voltage of the low-pass filtered input electrical signal.

8. The method of claim 1, wherein:
   a logical one of the high-speed optical data is provided by adding the drive current $I_D$ to the bias current $I_B$ applied to the laser, and a logical zero of the high-speed optical data is provided by removing the drive current $I_D$ from the bias current $I_B$ applied to the laser; and
   a logical one of the low-speed optical data is provided by adding the delta current $I_\Delta$ to the drive current $I_D$, and a logical zero of the low-speed optical data is provided by removing the delta current $I_{66}$ from the drive current $I_D$.

9. A circuit for providing optical communication comprising:

a laser; and
a laser driver circuit that digitally modulates an output of the laser to transmit high-speed optical data at a first bit rate; and
an amplitude modulation circuit that modulates an amplitude of the laser to transmit low- speed optical data at a second bit rate simultaneously with the high-speed optical data, wherein the first bit rate is higher than the second bit rate, wherein
the laser driver circuit and the amplitude modulation circuit applies a laser driver current $I_{LD}$ to the laser, and
the laser driver circuit is configured to modulate the laser driver current $I_{LD}$ by adding and removing a drive current $I_D$ to and from a bias current $I_B$ to produce the high-speed optical data, and by adding and removing a delta current $I_A$ to and from the drive current $I_D$ to produce the low-speed optical data.

10. The circuit of claim 9, further comprising:
a receiver circuit for converting the output of the laser into an input electrical signal, wherein the receiver circuit generates high-speed electrical data from the input electrical signal; and
an amplitude detector circuit electrically coupled to the receiver circuit for detecting amplitude variations of the output of the laser based on the input electrical signal, wherein the amplitude detector detects low-speed electrical data based on the detected amplitude variations.

11. The circuit of claim 10, wherein the receiver circuit comprises a photodiode and a transimpedance amplifier.

12. The circuit of claim 9, wherein:
the laser driver circuit controls the laser such that the high-speed optical data provided by the output of the laser is defined by a high optical power value $P_H$ that is above a threshold and a low optical power value $P_L$ that is below the threshold; and
the amplitude modulation circuit modulates the amplitude of the output of the laser at the second bit rate such that:
the high optical power value $P_H$ is either a first high optical power value $P_{H1}$ or a second high optical power value $P_{H2}$ that is greater than the first high optical power value $P_{H1}$; and
the low optical power value $P_L$ is either a first low optical power value $P_{L1}$ or a second low optical power value $P_{L2}$ that is less than the first low optical power value $P_{L1}$.

13. The circuit of claim 12, wherein:
a logical one of the high-speed optical data is provided by the high optical power value $P_H$, and a logical zero of the high-speed optical data is provided by the low optical power value $P_L$; and
a logical one of the low-speed optical data is provided by the second high optical power value $P_{H2}$ or the second low optical power value $P_{L2}$, and a logical zero of the low-speed optical data is provide by the first high optical power value $P_{H1}$ or the first low optical power value $P_{L1}$.

14. The circuit of claim 13, further comprising:
a receiver circuit for converting the output of the laser into an input electrical signal, wherein the input electrical signal has a digitally modulated high-speed electrical data component corresponding to the high-speed optical data, and an amplitude-modulated low-speed electrical data component corresponding to amplitude variations of the low-speed optical data; and
an amplitude detector circuit comprising:
a low-pass filter circuit operable to filter out the digitally modulated high-speed electrical data component of the input electrical signal such that the filtered input electrical signal switches between a first voltage $V_{MIN}$ corresponding to the first high optical power value $P_{H1}$ and a second voltage $V_{MAX}$ corresponding to the second high optical power value $P_{H2}$; and
a comparator circuit to detect the amplitude-modulated low-speed electrical data component by comparing the filtered input electrical signal to a reference voltage, wherein the comparator circuit generates a logical one when the second voltage $V_{MAX}$ greater than the reference voltage is present and a logical zero when the first voltage $V_{MIN}$ less than the reference voltage is present.

15. The circuit of claim 9, wherein:
a logical one of the high-speed optical data is provided when the laser driver circuit adds the drive current $I_D$ to the bias current $I_B$ applied to the laser, and a logical zero of the high-speed optical data is provided when the laser driver circuit removes the drive current $I_D$ from the bias current $I_B$ applied to the laser; and
a logical one of the low-speed optical data is provided when the laser driver circuit adds the delta current $I_A$ to the drive current $I_D$, and a logical zero of the low-speed optical data is provided when the laser driver circuit removes the delta current $I_A$ from the drive current $I_D$.

16. The circuit of claim 15, wherein the circuit comprises a bias current source that provides the bias current $I_B$, a drive current source that provides the drive current $I_D$, and a delta current source that provides the delta current $I_A$.

17. An active optical cable assembly comprising:
an optical fiber having a first end;
a first electrical connector at the first end of the optical fiber;
a laser disposed within the first electrical connector;
a laser driver circuit within the first electrical connector that digitally modulates an output of the laser to transmit high-speed optical data at a first bit rate over the optical fiber in accordance with a high-speed data stream received at the first electrical connector; and
an amplitude modulation circuit within the first electrical connector that modulates an amplitude of the laser to transmit low-speed optical data at a second bit rate simultaneously with the high-speed optical data over the optical fiber in accordance with a low-speed data stream received at the first electrical connector, wherein the first bit rate is higher than the second bit rate, wherein:
the laser driver circuit controls the laser such that the high-speed optical data provided by the output of the laser is defined by a high optical power value $P_H$ that is above a threshold and a low optical power value $P_L$ that is below the threshold; and
the amplitude modulation circuit modulates the amplitude of the output of the laser at the second bit rate such that:
the high optical power value $P_H$ is either a first high optical power value $P_{H1}$ or a second high optical power value $P_{H2}$ that is greater than the first high optical power value $P_{H1}$; and
the low optical power value $P_L$ is either a first low optical power value $P_{L1}$ or a second low optical power value $P_{L2}$ that is less than the first low optical power value $P_{L1}$.

18. The active optical cable assembly of claim 17, wherein:
a logical one of the high-speed optical data is provided by the high optical power value $P_H$, and a logical zero of the high-speed optical data is provided by the low optical power value $P_L$; and a logical one of the low-speed optical data is provided by the second high optical power value $P_{H2}$ or the second low optical power value $P_{L2}$, and a logical zero of the low-speed optical data is provide by the first high optical power value $P_{H1}$ or the first low optical power value $P_{L1}$.

19. The active optical cable of claim 18, further comprising:

a second electrical connector at a second end of the optical fiber;

a receiver circuit within the second electrical connector for receiving the output of the laser from the optical fiber, and converting the output of the laser into an input electrical signal, wherein the input electrical signal has a digitally modulated high-speed electrical data component corresponding to the high-speed optical data, and an amplitude-modulated low-speed electrical data component corresponding to amplitude variations of the low-speed optical data; and an amplitude detector circuit within the second electrical connector, the amplitude detector circuit comprising:

a low-pass filter circuit operable to filter out the digitally modulated high-speed electrical data component of the input electrical signal such that the filtered input electrical signal switches between a first voltage $V_{MIN}$ corresponding to the first high optical power value $P_{H1}$ and a second voltage $V_{MAX}$ corresponding to the second high optical power value $P_{H2}$; and a comparator circuit to detect the amplitude-modulated low-speed electrical data component by comparing the filtered input electrical signal to a reference voltage, wherein the comparator circuit generates a logical one when the second voltage $V_{MAX}$ greater than the reference voltage is present and a logical zero when the first voltage $V_{MIN}$ less than the reference voltage is present.

20. The active optical cable assembly of claim 17, wherein the laser driver circuit is configured to add and remove a drive current $I_D$ to and from a bias current $I_B$ to produce the high-speed optical data, and add and remove a delta current $I_\Delta$ to and from the drive current $I_D$ to produce the low-speed optical data.

* * * * *